Aug. 26, 1958  S. W. WALLIN ET AL  2,848,820
METHOD AND APPARATUS FOR SUPPORTING AND CONVEYING
WEB-LIKE MATERIAL
Filed Oct. 5. 1953  2 Sheets-Sheet 1
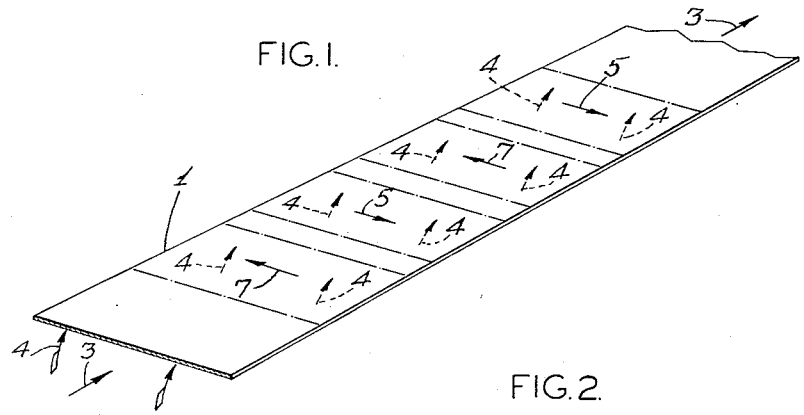
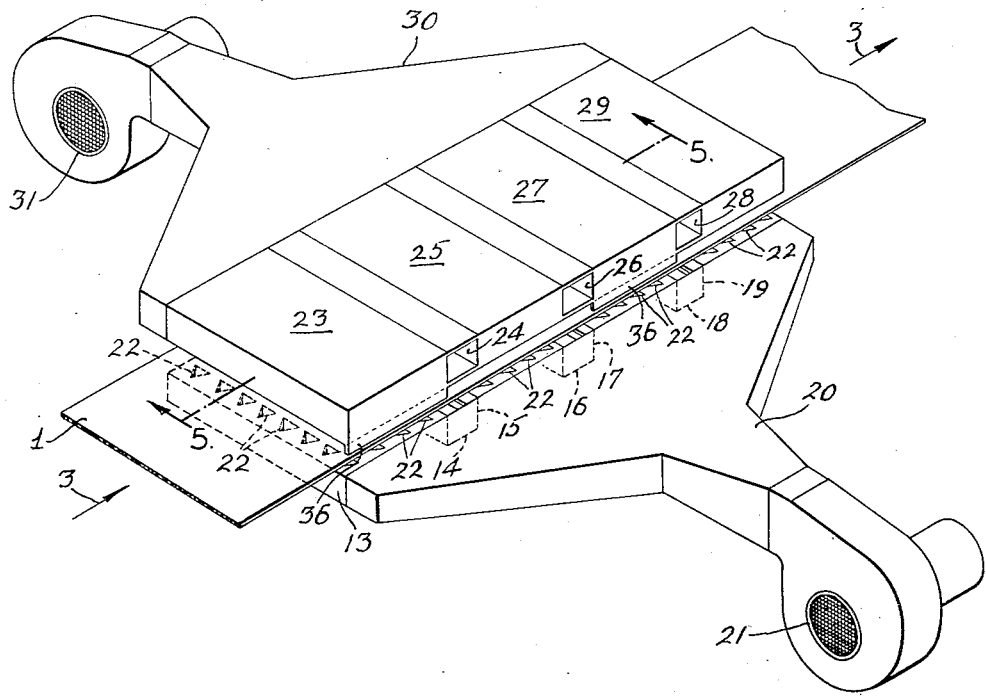
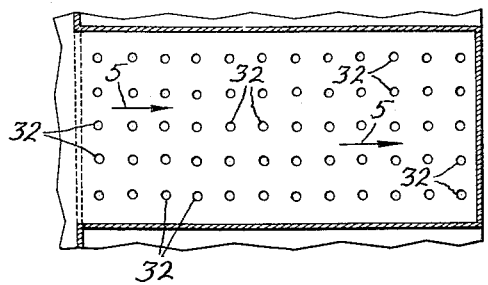
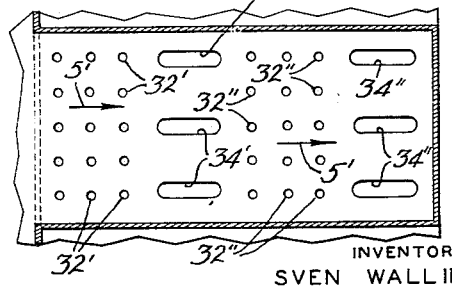
INVENTORS:
SVEN WALLIN
CLAES ALLANDER
BY
Howson & Howson
ATTYS.

United States Patent Office 2,848,820
Patented Aug. 26, 1958

2,848,820

METHOD AND APPARATUS FOR SUPPORTING AND CONVEYING WEB-LIKE MATERIAL

Sven Werner Wallin and Claes Allander, Jonkoping, Sweden, assignors to Aktiebolaget Svenska Flaktfabriken, Stockholm, Sweden Application October 5, 1953, Serial No. 384,184

Claims priority, application Sweden October 8, 1952

9 Claims. (Cl. 34—23)

Methods and devices of different kinds for supporting and conveying materials having substantially plane bottom surfaces are well known. In accordance with one conventional method for conveying material, a gaseous medium is continuously discharged towards the bottom surface of the material and is conducted away from the bottom surface of the material in such a manner that a film or cushion of gaseous medium under pressure is created beneath the bottom surface of the material. By this method, it is proposed to maintain a constant and low floating level for the material.

However, when conveying certain web-like materials, for instance, cellulose pulp, it has been found that under certain conditions, a fluttering occurs in the web. Such fluttering is often transmitted along the web. This is especially disadvantageous when threading the material through a drying machine.

It is an object of the present invention to substantially eliminate this drawback. The invention relates to an improvement of conventional methods and apparatus for supporting and conveying web-like materials. According to the invention, a gaseous medium from a source is discharged in a conventional manner through spaced groups of a plurality of openings toward the underside of the web-like material, and is conducted away or exhausted in substantially the same direction as the movement of the material by outlet channels which alternate with the spaced groups of inlet openings. A gaseous medium from the same or a different source is discharged towards the upper side of the web and is conducted away or exhausted laterally in a direction substantially perpendicular to the direction of travel of the web and parallel to the plane of the web.

In one embodiment of the invention, a first gaseous medium is supplied obliquely toward the underside of the web through a large number of openings and is conducted away by means of channels extending across the entire width of the web perpendicular to the direction of travel of the web, so that the medium flows under the web concurrent to its direction of travel. A second gaseous medium is discharged substantially perpendicularly towards the upper side of the web and is conducted away or exhausted laterally towards one of the side edges of the web so that it flows substantially perpendicular to the direction of movement of the web and parallel to the plane thereof.

In accordance with the preferred embodiment of the invention, the second medium is discharged substantially perpendicular to and against the upper side of the web and is conducted away alternately toward the left and right side edges of the web along the path of travel thereof.

Preferably, the gaseous medium which is discharged toward the upper side of the web is discharged with a velocity of at least 30 percent, and not more than 150 percent of the velocity of the gaseous medium which is discharged toward the underside of the web.

The gaseous medium which is discharged toward the lower and upper sides of the web is suitably conditioned so that in addition to supporting and stabilizing the web in its travel through the apparatus, it also effects drying of the web.

The invention is based on the principle that the gaseous medium which is discharged toward the underside of the web produces a component in the direction of movement of the web, partly due to the fact that the jets are slightly angularly directed, and partly due to the fact that the total quantity of the medium increases towards the outlet channels. This longitudinal component tends to cause fluttering in the web longitudinally thereof in the direction of its movement. By laterally discharging the medium directed towards the upper side of the web, there is a transverse component coplanar with the confronting surface of the upper inlet boxes directed perpendicular to the direction of movement of the web. This transverse component is due to the discharge of the total quantity of medium at the side edges of the web and, if desired, may be increased by providing an oblique angle of discharge of the medium. The transverse component produces a tendency of the web to flutter transversely perpendicularly to the transport direction in the plane of movement of the web. Since the web is not readily bent in two different directions, fluttering does not occur and the web remains substantially flat during its movement along the path of travel intermediate the lower and upper inlet boxes for the medium.

The invention also relates to apparatus for supporting and conveying web-like material along a path provided with means for discharging a gaseous medium toward the web-like material together with means for conducting away or exhausting the gaseous medium from the web-like material. The apparatus comprises a plurality of supply boxes arranged in longitudinally spaced relation both above and below the path of travel of the web material. The supply boxes are each connected to suitable pump means for supplying a gaseous medium thereto and each of the boxes has a plane wall disposed in spaced parallel confronting relation to the path of the web material. The confronting wall of each box is provided with a plurality of discharge openings for discharging the gaseous medium towards the upper and undersides of the web material, respectively. The spaces between adjacent supply boxes mounted at the underside of the path of travel of the web material constitute channels through which the gaseous medium discharged from the adjacent supply box is conducted away or exhausted. The spaces between the supply boxes mounted above the path of travel of the web, are closed off, and means is provided to conduct away or exhaust the gaseous medium laterally of the path of movement of the web in a direction at right angles thereto, for example by extending one of the end walls of the upper supply boxes beyond the confronting plane wall of the box toward the upper side of the web, or beyond the edges of the web toward the upper wall of the corresponding lower supply box.

A suitable embodiment of the apparatus is characterized in that the right hand end walls of the alternate upper supply boxes are extended beyond the underside thereof toward the web, and the left hand end walls of the intermediate supply boxes are extended beyond the underside thereof towards the web, so that the medium is exhausted alternately toward the right and left side edges of the web respectively, thereby affording better stabilization of the web as well as improved drying thereof.

In one embodiment of the apparatus, the confronting plane walls of the upper supply boxes are provided with a number of preferably elongated apertures for conducting away or exhausting the gaseous medium which has been supplied to the upper side of the web.

The upper and lower supply boxes are arranged at different sides of the web in vertical alignment with one another.

All of the objects of the present invention and the various features and details of the construction and operation thereof are more fully set forth with reference to the accompanying drawings showing illustrative embodiments of the invention, wherein:

Fig. 1 is a diagram illustrating the principle of the method of the present invention;

Fig. 2 is a perspective view of a suitable apparatus made in accordance with the present invention;

Fig. 3 is a sectional view taken on the line 3—3 of Fig. 7 showing the lower wall of the upper supply box;

Fig. 4 is a view similar to Fig. 3 of a modified form of lower wall;

Figure 5:
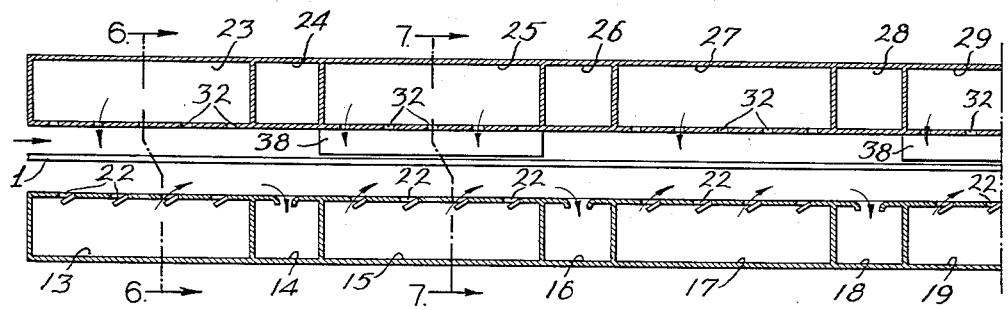
Fig. 5 is a longitudinal sectional view taken on the line 5—5 of Fig. 2.
Figure 6:
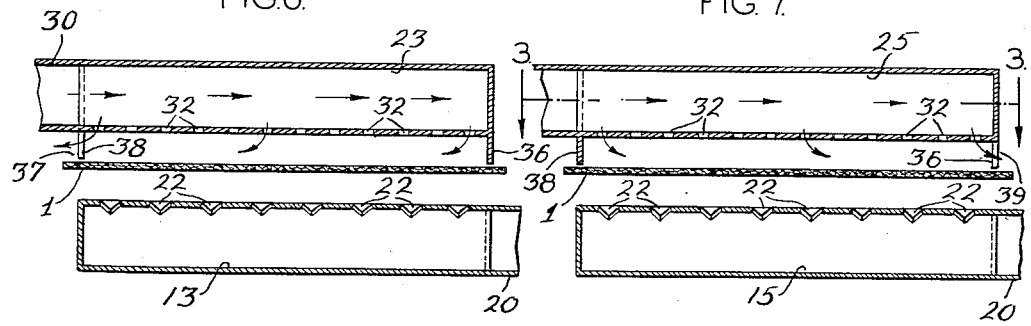
Figure 7:
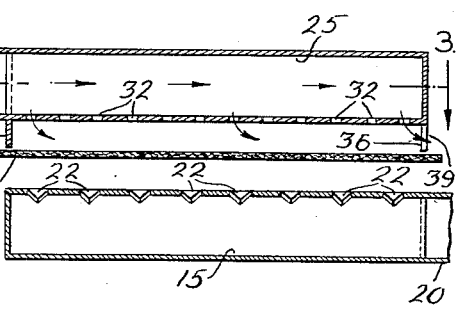
Figure 8:
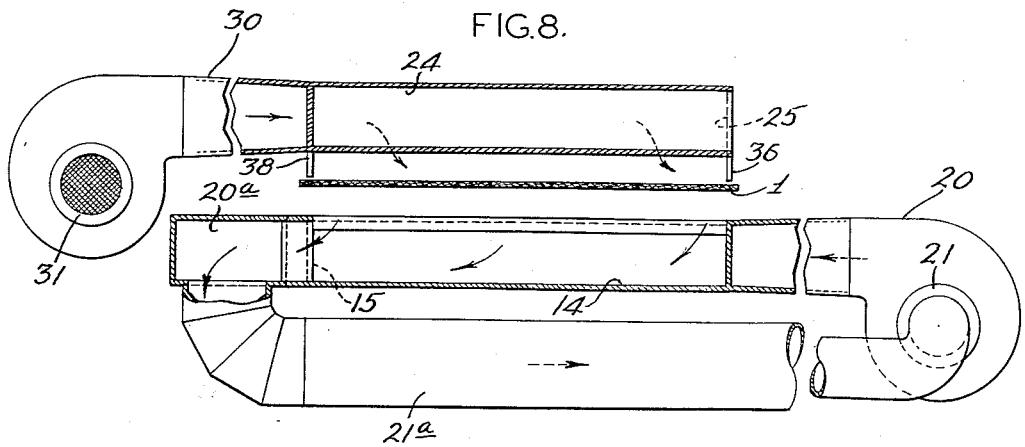

Figs. 6 and 7 are fragmentary transverse sectional views taken on the lines 6—6 and 7—7 respectively of Fig. 5; and Fig. 8 is a fragmentary transverse sectional view taken through the discharge channel intermediate successive lower supply boxes and showing a method of recirculating the medium discharged therethrough.

In Fig. 1, the web-like material, for instance, cellulose or similar material, is designated 1, and the direction of movement thereof is designated by arrows 3, 3. The arrows 4 show the direction of the medium discharged towards the lower side of the web material and the arrows 5 and 7 show the direction of the medium supplied to the upper side of the web. In the illustrated embodiment, the gaseous medium is discharged perpendicularly towards the top side of the web and is caused to turn towards the side edges of the web. As indicated at 5 and 7, the flow of gaseous medium is alternately towards the right and left edges of the web in successive sections longitudinally of its direction of travel.

In the apparatus illustrated in Fig. 2, the web 1 is caused to move through the apparatus in the direction indicated by the arrows 3. The apparatus includes a number of supply boxes 13, 15, 17 and 19 having discharge openings 22 confronting the underside of the web for supplying gaseous medium thereto. These boxes are connected by means of a distributing duct or hood 20 to pump means for supplying a gaseous medium to said boxes. The boxes 13, 15, 17 and 19 are equally spaced from each other so that channels 14, 16 and 18 are formed between them. These channels extend crosswise of the path of movement of the web and may be connected (by conventional means for example a hood 20a and a duct 21a as shown in Fig. 8) to the suction side of the pump means 21 for recirculating the gaseous medium. In the preferred embodiment of the invention, the openings 22 in the top of the lower supply boxes are formed by punching with hoods which function to direct the jets of gaseous medium in an angular direction toward the underside of the web. Thus, a component acting in the direction of travel of the web is obtained by this design of the lower boxes 13, 15, 17 and 19.

Means is provided to supply medium to the upper side of the web and to cause the major part of the medium to flow above the web parallel to the plane thereof in a direction substantially at right angles to the travel of the web toward the side edges of the web. To this end, upper supply boxes 23, 25, 27 and 29 are connected to pump means 31 for circulating the medium by means of a distributing duct or hood 30. The lower surfaces of the upper supply boxes confronting the web are provided with openings 32 to discharge the medium towards the upper side of the web. The upper boxes are mounted at equally spaced distances along the path of travel of the web and the spaces intermediate the upper supply boxes are designated 24, 26 and 28.

In the illustrated embodiment, the wall 36 at the right-hand end of the alternate upper supply boxes 23 and 25 is extended downwardly toward the web, or beyond the edge of the web toward the corresponding lower box, and at the opposite end of the box an open passage is provided as indicated at 37 between the bottom wall of the upper box and the web. The intermediate boxes 25 and 29 are provided with an extended wall 38 at the left hand end and an open passage 39 at the other end.

The lower wall of the upper boxes may be formed as illustrated in Fig. 3. By this design of the upper boxes 23, 25, 27 and 29, the medium which is supplied to the upper side of the web is caused to turn crosswise or transversely to the web as indicated by the arrows 5 and 7. This results in a component parallel to the plane of the web in a direction at substantially right angles to the travel thereof.

A modified design of the lower wall of the upper boxes is shown in Fig. 4, wherein the inlet openings are designated 32' and 32'' respectively. The number of inlet openings is less than the previously described embodiment. In addition, a number of outlet or exhaust apertures 34' are provided and arranged in such a manner that a group of outlet apertures 34' cooperates with a number of adjacent inlet openings 32', while the succeeding inlet openings 32'' (reckoned in the direction of flow of the medium) in turn cooperate with the apertures 34''. This design effects a crosswise flow of medium supplied to the upper side of the web as in the case of the design shown in Fig. 3, as indicated by the arrows 5'.

While particular embodiments of the present invention have been illustrated and described, it is not intended to limit the invention to such disclosure, but changes and modifications may be made therein and thereto within the scope of the following claims.

We claim:

1. The method of conveying web-like materials along a path which comprises, directing groups of a plurality of jets of a first gaseous drying medium against the underside of a web of material at equally spaced intervals longitudinally in the direction of travel thereof, restraining the flow of the first gaseous drying medium to cause the major part of the medium discharged by each group of jets to flow beneath the web in the direction of travel thereof, exhausing the discharged medium from beneath the web of material at intervals therealong between adjacent groups of said jets, directing upper groups of a plurality of jets of a second gaseous medium against the upper side of the web at equally spaced intervals longitudinally thereof in apposition to the groups of jets at the underside of the web, restraining the flow of the second gaseous drying medium to cause the major part of the second medium discharged by each of said upper groups of jets to flow above the web parallel to the plane thereof in a direction transversely at substantially right angles to the travel thereof toward a side edge of said web, and exhausting the second medium from above the web laterally thereof at spaced intervals therealong.

2. The method claimed in claim 1 wherein the groups of jets of the first gaseous medium are discharged obliquely to the web of material inclined in the direction of travel thereof and the groups of jets of the second gaseous medium are discharged substantially perpendicular to the web of material.

3. The method claimed in claim 1 wherein the jets of the second gaseous medium are discharged substantially perpendicular to the web of material and the flow of the medium discharged by successive groups of jets is restrained to cause the medium to flow alternately in opposite directions transversely of the travel of the web and the medium is exhausted laterally from the opposite side edges of the web.

4. The method claimed in claim 1 wherein the velocity of the jets of the first gaseous medium discharged at the underside of the web of material is greater than the velocity of the jets of the second gaseous medium discharged above the web of material.

5. The method claimed in claim 1 wherein the first and second gaseous mediums are predeterminedly conditioned to produce a drying effect on the web material.

6. Apparatus for supporting and conveying web-like materials along a path comprising duct means having uniformly spaced groups of a plurality of openings arranged transversely and longitudinally beneath the path of web travel substantially parallel and adjacent thereto and constituting discharge openings for directing jets of a first gaseous medium towards the underside of the web, blower means communicating with said duct means and operable to discharge the first gaseous medium through said discharge openings, means to conduct away the major part of the gaseous medium at points spaced longitudinally from each group of discharge openings in the direction of travel of the web comprising a transverse passage intermediate adjacent groups of said discharge openings, suction means operatively connected to each such passage, duct means having uniformly spaced groups of a plurality of openings arranged transversely and longitudinally above the path of web travel substantially parallel and adjacent thereto and constituting second discharge openings for directing jets of a second gaseous medium towards the upperside of the web, blower means communicating with said duct means and operable to discharge the second gaseous medium through said second discharge openings, and restraining means adjacent one side edge of the web to cause the major part of the second gaseous medium discharged from each group of second openings to flow parallel to the plane of the web in a direction transversely at right angles to the path of travel of the web material toward the opposite side edge thereof.

7. Apparatus as claimed in claim 6 wherein each group of second discharge openings includes at least on relatively large outlet opening for exhausting the second gaseous medium discharged through the discharge openings.

8. Apparatus as claimed in claim 6 wherein the discharge openings at the underside of the path of travel of the web are constructed to discharge the gaseous medium obliquely towards the underside of the web material and inclined in the direction of travel thereof.

9. Apparatus according to claim 6 wherein alternate longitudinally spaced groups of openings are provided with restraining means adjacent one side edge of the web to cause the second gaseous medium discharged therethrough to flow toward the opposite side edge of the web, and the intermediate longitudinally spaced groups of openings are provided with restraining means adjacent the opposite side edge of the web to cause the second gaseous medium discharged therethrough to flow toward the one side edge of the web.

References Cited in the file of this patent

UNITED STATES PATENTS

| | | |
|---|---|---|
| 857,096 | McCord | June 18, 1907 |
| 2,060,430 | Spooner | Nov. 10, 1936 |
| 2,081,945 | Massey et al. | June 1, 1937 |
| 2,133,330 | Offen | Oct. 18, 1938 |
| 2,144,919 | Gautreau | Jan. 24, 1939 |
| 2,351,549 | Schwartz | June 13, 1944 |
| 2,538,972 | Magnami | Jan. 23, 1951 |
| 2,678,237 | Allander | May 11, 1954 |
| 2,682,116 | Dungler | June 29, 1954 |

FOREIGN PATENTS

| | | |
|---|---|---|
| 6,691 | Great Britain | Sept. 1, 1900 |